United States Patent
Boyes, Jr. et al.

(10) Patent No.: US 8,693,059 B2
(45) Date of Patent: Apr. 8, 2014

(54) PRINTER CONTROLLED DYNAMICALLY ALTERED N-UP IMAGING

(75) Inventors: J. Wesley Boyes, Jr., Loveland, CO (US); Allan A. Hren, Longmont, CO (US); Elke M. Jones, Llano, TX (US); Kent S. Norgren, Louisville, CO (US); Brian C. Pendleton, Longmont, CO (US); Kenneth S. Shouldice, Firestone, CO (US); Larry D. Teklits, Loveland, CO (US); Ronald Earl Van Buskirk, II, Tucson, AZ (US); Rose E. Visoski, Louisville, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 2148 days.

(21) Appl. No.: 11/229,343

(22) Filed: Sep. 16, 2005

(65) Prior Publication Data
US 2007/0070374 A1 Mar. 29, 2007

(51) Int. Cl.
*G06T 5/00* (2006.01)
*H04N 1/40* (2006.01)

(52) U.S. Cl.
USPC .......... 358/3.26; 358/3.24; 358/1.9; 358/2.1; 358/1.13; 358/1.12; 358/1.18

(58) Field of Classification Search
USPC .............. 358/1.9, 3.24, 1.14–1.18, 537–540, 358/452, 453, 2.1; 382/302–307
See application file for complete search history.

(56) References Cited

U.S. PATENT DOCUMENTS

| | | | | |
|---|---|---|---|---|
| 5,493,635 A | * | 2/1996 | Brindle et al. | 358/1.15 |
| 5,669,040 A | * | 9/1997 | Hisatake | 399/83 |
| 5,715,379 A | * | 2/1998 | Pavlovic et al. | 358/1.13 |
| 5,768,488 A | | 6/1998 | Stoner et al. | |
| 6,175,423 B1 | | 1/2001 | Frickey | |
| 6,631,007 B1 | | 10/2003 | Buis et al. | |
| 6,850,335 B1 | | 2/2005 | Barry | |

(Continued)

FOREIGN PATENT DOCUMENTS

| | | |
|---|---|---|
| JP | 5262003 | 10/1993 |
| JP | 8263233 | 10/1996 |

(Continued)

OTHER PUBLICATIONS

OCE Corporation; "Oce Operating Manual—Variostream 7200-7650 Pinless"; Exceprted pp. 76-88; (author, exact title, publishing date all unknown—only excepted pages known to applicants).

Primary Examiner — Chad Dickerson
(74) Attorney, Agent, or Firm — Duft Bornsen & Fettig LLP

(57) ABSTRACT

Systems and methods are provided for printer controller, dynamic N-UP print job imaging. An enhanced printer includes features hereof to dynamically adjust parameters of a print job at any point in a print job. In one aspect hereof, the printer configures a print job for an initial set of printing parameters without host system intervention and may reconfigure those parameters during printing of the print job. In another aspect hereof, the adjustments may include adjusting the relative position of any of the N-UP images independent of any other of the N-UP images. Another aspect hereof provides that the formatting of the print job according to printing parameters by the printer occurs after rasterizing the print job into logical page images. Since the formatting is performed after rasterizing, the printing parameters may be changed at any time during printing of the print job.

20 Claims, 8 Drawing Sheets

(56) References Cited

U.S. PATENT DOCUMENTS

| | | |
|---|---|---|
| 7,027,187 B1 * | 4/2006 | Zuber ............................. 358/1.9 |
| 7,162,172 B2 * | 1/2007 | Grace et al. ..................... 399/49 |
| 2002/0069228 A1 * | 6/2002 | Mori et al. .................... 707/524 |
| 2003/0113130 A1 | 6/2003 | Robertson et al. |
| 2003/0147097 A1 | 8/2003 | Kotani et al. |
| 2003/0160975 A1 | 8/2003 | Skurdal |
| 2003/0161670 A1 | 8/2003 | Watanabe et al. |
| 2003/0227652 A1 | 12/2003 | Masaki |
| 2004/0008376 A1 | 1/2004 | Okajima |
| 2004/0070788 A1 | 4/2004 | Barry et al. |
| 2004/0177996 A1 | 9/2004 | Karavakis et al. |
| 2004/0205607 A1 | 10/2004 | Kim et al. |
| 2004/0212825 A1 | 10/2004 | Sai et al. |
| 2004/0227962 A1 | 11/2004 | Xia |
| 2005/0286100 A1 * | 12/2005 | Uotani et al. ................. 358/527 |

FOREIGN PATENT DOCUMENTS

| | | | |
|---|---|---|---|
| JP | 10143342 | | 5/1998 |
| JP | 2000-127549 | | 5/2000 |
| JP | 2000-177197 | | 6/2000 |
| JP | 2000-255124 | | 9/2000 |
| JP | 2000255124 A | * | 9/2000 |
| JP | 2004-064288 | | 2/2004 |
| JP | 2004064288 A | * | 2/2004 |
| JP | 2005-059374 | | 3/2005 |
| JP | 2005074809 | | 3/2005 |
| JP | 2005-148992 | | 6/2005 |

* cited by examiner

PRINTER CONTROLLED DYNAMICALLY ALTERED N-UP IMAGING

BACKGROUND OF THE INVENTION

1. Field of the Invention

The invention relates to the field of printing systems, and in particular, to methods and systems for N-UP print imaging dynamically controlled by a printer so as to permit dynamic changes in printing parameters during printing of a print job as well as to permit other printing parameters to be modified by local operation of the printing system independent of the host systems that supply print jobs.

2. Statement of the Problem

Printing systems associated with data processing enterprises generally include a localized printer controller within the printing system. The printer controller controls overall operation of the printing system including, for example, host interfacing, page description language interpretation and rasterization, and lower level process control or interface features of the printing engine associated with the printing system. Host interaction may include appropriate adapters for coupling the printing system to one or more host systems utilizing one or more communication media and one or more communication protocols. Print jobs (often referred to as "raw print jobs") are received by the printing system from one or more attached host computer systems. The raw print jobs are generally encoded in the form of a page description language such as PostScript, HP PCL, etc. In addition, raw print jobs may be encoded as simple character streams (ASCII or EBCDIC) with no page description formatting associated therewith. Still further, any single job may be encoded using multiple page description languages or encodings. For example, a banner page may be encoded in simple ASCII characters, various other pages of the same job may be encoded as PostScript and some pages may include PCL encoded material—all within a single print job. In whatever form the raw print job may be encoded or formatted, the printer controller within the printing system interprets the received information to generate rasterized images of pages represented by the received, encoded, raw print job. Each rasterized page image generally comprises a 2-dimensional array of picture elements ("pixels") that represent a corresponding formatted page of the received raw print job. Each pixel may represent an encoded color value in accordance with the requirements of the particular raw print job encoding and the capabilities of the printing system on which the print job is to be printed. The process of interpreting the raw print job to generate corresponding rasterized page images is typically referred to as "ripping" or "rasterizing" and the sequences of rasterized pages may be referred to herein as a "ripped print job" or a "rasterized print job".

The printer controller may store or buffer one or more ripped print jobs in accordance with storage capabilities of the particular architecture of a particular printer controller. Each ripped print job comprises one or more rasterized images, each referred to as a "logical page" of the ripped print job. The printer controller may then apply the logical pages to a print engine (sometimes also referred to as an "imaging engine" or as a "marking engine"). The print engine then interacts with the imaging process to mark the printable medium (e.g., the sheet of paper) with the logical pages provided by the printer controller. For example, where the print engine is an electrophotographic imaging engine (e.g., a laser print engine), a laser or other optical imaging system transfers each logical page rasterized image to corresponding pixels on paper formed as particles of toner electrostatically transferred to the paper As is generally known in the art, the host system may encode or format the raw print job to present rasterized logical pages in accordance with a number of print parameters. Print parameters may be associated with the particular print engine or printing system and/or may be associated with the raw print job as specified by the host systems. One common formatting technique used in host systems and by printer controllers is to print multiple logical pages on a single sheet of printable medium. Multiple logical pages may be applied to opposing sides of the printable medium (often referred to as duplex or two-sided printing) and/or multiple logical pages may be applied to the same side of the printable medium (often referred to as N-UP printing).

Where a host system defines a print job as using such duplex and/or N-UP formatting of logical pages, some present print controllers are not adapted to modify this formatting parameter. Rather, the printer controller generally applies the logical pages to the printable medium exactly as the host system requested and regardless of the particular environment of the print engine and printing system. Some present day printing systems include a printer controller adapted to reformat a host-supplied raw print job to change the N-UP printing parameter. For example, a 1-UP raw print job may be reformatted by such a printer controller of the printing system to print the job as an N-UP print job based on printing parameters known to the printing system. Such printing parameters may include, for example, dimensions of the printable medium. By way of example, a host system may format a 1-UP raw print job comprising multiple 8.5"×11" (letter size) pages and transfer the raw print job to a printing system having continuous feed 19 inch wide paper. The printing system may then determine that the raw print job may be most efficiently printed as a 2-UP print job with two letter size logical pages printed side by side on the 19 inch wide printable medium.

Some presently known print controllers that provide such reformatting capability do so as they interpret the raw print job to generate a ripped print job. In other words, some present print controllers with N-UP job reformatting capability do so at the time of ripping. Thus, to change the N-UP printing parameter, the parameter must be changed at the beginning of the ripping process in the printer controller. If the print operator wishes to change the N-UP printing parameter after a ripped print job has begun printing in the print engine, the ripped print job must be restarted, or re-ripped with new print parameters to change the N-UP positioning of logical pages on sheets of paper. Though it may be beneficial to permit changing of such print parameters in the middle of printing a long print job, present print controllers that force restarting of a lengthy print job are wasteful of paper and other resources of the print system in that the already printed beginning portion of a potentially lengthy print job will require reprinting to change the N-UP print parameter. Thus, it is a problem for presently known printing systems and printer controllers to dynamically change the N-UP printing parameter in the middle of a print job for which transfer to the printable medium has already commenced within the print engine.

SUMMARY OF THE SOLUTION

The invention solves the above and other related problems with methods and associated systems and apparatus operable to permit dynamic changes in N-UP related printing parameters of a print job as it is being printed. The N-UP printing parameter may be changed at any time during the printing of a print job and the changed parameter may take effect for the remainder of the print job without requiring restarting or re-ripping of the entirety of the print job.

Numerous other features are also enabled by the enhanced capability of a print system in accordance with features and aspects hereof to dynamically change the N-UP printing parameter associated with printing a print job. For example, where a raw print job as provided by an attached host system specifies a first number of copies to be printed for the specified print job, a printer operator at the printing system may modify that parameter and alter the N-UP formatting of the print job to best utilize print media and other resources associated with the particular printing system. Or, for example, multiple print jobs, each associated with one or more page description languages, may be reformatted dynamically by the printing system in accordance with features and aspects hereof to permit N-UP printing. For example, multiple independent jobs encoded in different page description languages to be printed side by side (i.e., N-UP) thereby improving printing system utilization and reducing waste of print media and other resources. Or, for example, a single job encoded using multiple page encodings or page description languages and hence presented to the print controller as a 1-UP job may be rasterized and then re-formatted as an N-UP rasterized print job. These and other beneficial features may be associated with the fundamental capability of a printing system in accordance with features and aspects hereof to dynamically modify N-UP printing parameters for formatting logical pages to be transferred to printable medium in a particular printing engine.

One feature hereof provides structures and/or a method operable within a printer controller associated with at least one print engine for printing N-UP print jobs. The method includes receiving a print job and rasterizing the received print job to generate a rasterized print job wherein the rasterized print job comprises one or more logical pages. The method also includes initiating printing of the rasterized print job as an N-UP print job according to an initial set of printing parameters associated with the rasterized print job. The method also provides for changing at least one of the printing parameters associated with the rasterized print job during printing of the rasterized print job and continuing to print the rasterized print job according to the changed set of printing parameters.

Another aspect hereof further provides that the printer controller's step of initiating initiates printing on a first print engine, and that the step of continuing continues printing on a second print engine distinct from the first print engine.

Another aspect hereof further provides for changing, by operation of the printer controller, at least one of the printing parameters to adapt to a difference between the first print engine and the second print engine.

Another aspect hereof further provides for changing, by operation of the printer controller, position of any logical page of the rasterized print job independent of all other logical pages in the N-UP print job.

Another aspect hereof further provides for changing, by operation of the printer controller, orientation of any logical page of the rasterized print job independent of all other logical pages in the N-UP print job.

Another aspect hereof further provides that the N-UP print job is printed as a two-sided print job with each sheet having a front side and a back side. The changing step operable within the printer controller then includes setting a lock option so that subsequent re-positioning of a logical page by operation of the printer controller on the front side of the N-UP print job will be automatically duplicated on a corresponding logical page on the back side of each sheet of the N-UP print job.

Another aspect hereof further provides that the N-UP print job is printed as a two-sided print job with each sheet having a front side and a back side. The changing step operable within the printer controller then includes setting a snap option so that current position of a logical page on the front side of the N-UP print job will be automatically duplicated by operation of the printer controller on a corresponding logical page on the back side of each sheet of the N-UP print job.

Another aspect hereof further provides for changing, by operation of the printer controller, a printing parameter relating to the value of N used for continuing the printing of the N-UP print job.

Another aspect hereof further provides for changing, by operation of the printer controller, a printing parameter indicative of the number of copies of the rasterized print job that are to be printed.

Still another feature hereof includes structures and methods operable within a printer controller for printing N-UP print jobs. The method includes receiving a print job wherein the received print job specifies X copies of the print job are to be printed and rasterizing the received print job to generate a rasterized print job. The method then also includes changing the number of copies to Y copies where Y is greater than X. The method also includes printing the rasterized print job as an N-UP print job with Y copies generated as side by side logical pages on N-UP sheets of paper.

Another feature hereof provides structures and methods operable in a printer controller to print N-UP print jobs. The method includes receiving a first print job encoded in a first page encoding and receiving a second print job encoded in a second page encoding. The method also includes rasterizing the first print job in accordance with the first page encoding to generate a first rasterized print job and rasterizing the second print job in accordance with the second page encoding to generate a second rasterized print job. The method also includes formatting the first and second rasterized print jobs to print as a single N-UP print job and printing the N-UP print job.

Another feature hereof provides structures and methods operable in a printer controller to print N-UP print jobs. The method includes receiving a print job encoded using multiple page encodings and encoded as a 1-UP raw print job. The method then includes rasterizing the 1-UP raw print job in accordance with the multiple page encodings to generate a 1-UP rasterized print job and formatting the 1-UP rasterized print job to print as an N-UP print job where N is greater than 1. The method then prints the 1-UP raw print job as an N-UP rasterized print job.

The invention may include other exemplary embodiments described below.

DESCRIPTION OF THE DRAWINGS

The same reference number represents the same element on all drawings.

DETAILED DESCRIPTION OF THE INVENTION

FIGS. 1-7 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
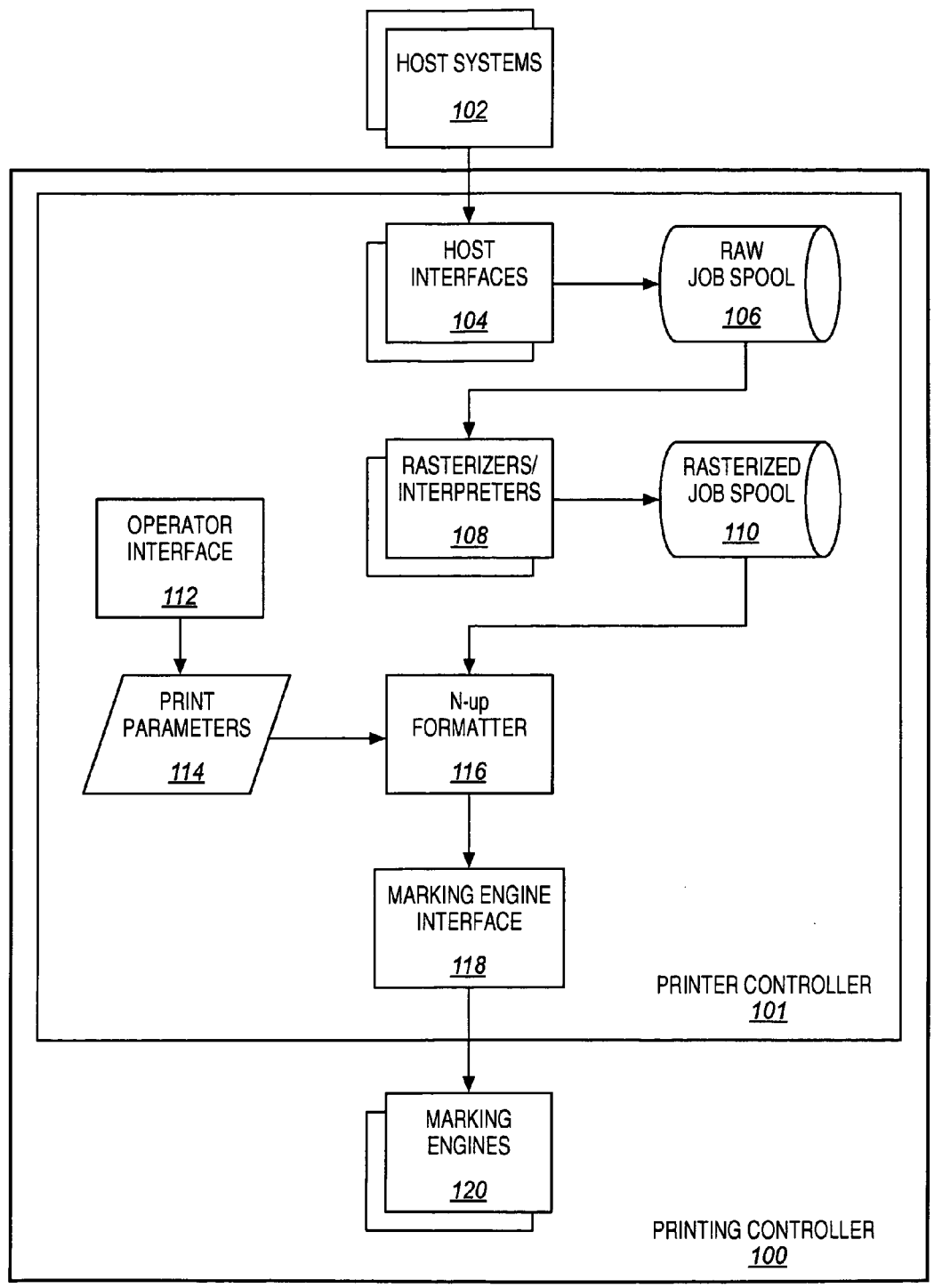
FIG. 1 is a block diagram of an exemplary printing system enhanced in accordance with features and aspects hereof.

FIG. 1 illustrates a printing system 100 coupled to one or more host systems 102 for receiving raw print jobs therefrom and for imprinting the raw print jobs on appropriate printable medium. It is common that the printable medium is paper. The printing system may utilize pre-cut sheets of paper or may use paper in the form of continuous feed (e.g., fanfold of rolls of paper). Those of ordinary skill in the art will recognize that other equivalent printable media may be used in appropriate printing systems. As used herein, "paper" may be understood to include any printable medium used in a computer printing system. Therefore the invention as recited in the claims that follow are intended to broadly cover any printing system that may use paper or other printable media.

Printing system 100 may generally include printer controller 101 for controlling overall operation of the printing system 100. Printer controller 101 is generally responsible for interfacing with the host systems 102 via host interfaces 104 to receive raw print jobs. Host interfaces 104 couple printing system 100 through printer controller 101 to host systems 102 through any of several well-known protocols and associated communication media including, for example, IBM channel connections, other high speed parallel bus structures, high speed serial communications, etc.

Raw print jobs received in controller 101 are applied through raw job spool 106 to one or more appropriate rasterizers/interpreters 108. Rasterizers/interpreters 108 represent features within printer controller 101 for interpreting the page description language or other command language used for encoding raw print jobs. For example, PostScript, HP PCL, and other page description languages may be used to encode the data to be imprinted on the printable medium. In addition, rasterizers/interpreters 108 may include simpler interpreters intended for decoding simple ASCII or EBCDIC encoded textual information largely devoid of page layout or page formatting features. Those of ordinary skill in the art will recognize that a plurality of such rasterizers/interpreters 108 may be provided in accordance with the needs of any particular application for providing one or more page description language encoding features. Many present day printing systems include at least PostScript and HP PCL as two available page description languages for encoding raw print jobs. In general, rasterizers/interpreters 108 interpret the language of the received print jobs and generate corresponding logical pages representing the imprinted page images of the received raw print jobs. Each logical page generated by rasterizers/interpreters 108 is represented as a two-dimensional array of pixels where each pixel is a value indicating the color and/or intensity of the corresponding pixel.

The logical pages generated by rasterizers/interpreters 108 are provided as a rasterized print job through rasterized job spool 110 and N-UP formatter 116. N-UP formatter 116 positions the logical pages of a rasterized print job in accordance with print parameters 114 for imaging on sheets of paper and forwards the formatted images to the marking engines 120 through the marking engine interface 118. The marking engines 120 then affix the pixels of the formatted pages onto the printable medium to generate the final printed sheets. Marking engines 120 (also commonly referred to as printing engines or imaging engines) may affix or mark pixels on paper using liquid or dry toning/inking materials applied via mechanical, electrostatic, and/or electrophotographic means.

In accordance with features and aspects hereof, N-UP formatter 116 may modify the formatting of logical pages into physical sheets of paper in accordance with changes to print parameters 114. In contrast with prior techniques, features and aspects hereof allow N-UP formatter 116 to modify the formatting of a previously rasterized print job while printing the job. In other words, N-UP formatter 116 may modify the formatting of logical pages any time during printing of a rasterized print job without requiring restart of the print job and without requiring re-rasterization of the initial raw print job by operation of rasterizers/interpreters 108.

Numerous situations may benefit from such dynamic reformatting of previously rasterized print jobs. For example, a paper supply used by the marking engines 120 could be exhausted in the middle of printing a large rasterized print job. A new paper supply may be provided having different characteristics such as a different sheet size. N-UP formatter 116 may be instructed, through alterations to print parameters 114, to modify the formatting of logical pages as applied to physical paper sheets to better utilize the different dimensions of the newly supplied paper.

Or, for example, in high speed, two-sided (i.e., duplex) printing on continuous form paper, it is common to utilize multiple marking engines where one marking engine marks on the front side of each sheet and the second engine marks the back side of each sheet. Thus, the continuous form paper moves completely through the first marking engine before the second marking engine imprints the back side of the printable medium. Imaging characteristics of the printable medium may change after exiting the first imaging engine. For example, the paper may shrink after imaging by the first print engine. Further, parameters relating to the imaging characteristics of the second print engine such as image position offsets and controls may differ from that of the first print engine. In another example, where a print job exhausts the paper supply of a first imaging engine marking engine, the print job may be continued on a different marking engine while awaiting re-supply of the paper source in the first print engine. Thus, two different marking engines could be used to complete the printing of an interrupted lengthy rasterized print job. The formatter 116 may therefore adjust the placement or other characteristics of logical pages formatted to create the imaged sheet to adapt to changes in the print engine or other environmental aspects of the printing of the print job.

These and other scenarios may give rise to the need to change printing parameters during the printing of a lengthy rasterized print job. It is therefore useful for N-UP formatter 116 to allow changes in the formatting of a previously rasterized print job without the need for restarting or re-rasterizing the previously rasterized print job.

Operator interface 112 of printer controller 101 permits a print operator to readily modify print parameters 114 at any time. N-UP formatter 116 may monitor print parameters 114 to detect changes therein or may be otherwise notified by inter-process communication techniques from operator interface 112 to begin reformatting the rasterized print job in accordance with new, changed print parameters 114. Operator interface 112 may include any suitable interface devices and techniques useful for presenting information to an operator and for receiving input from the operator. Display devices, voice input and output devices, pointer input devices, keyboard input devices, tactile input devices, are all examples of common I/O devices useful for such operator interface features. Graphical and textual information may be presented and received from an operator in accordance with any of several well-known user interfacing techniques and structures.

Those of ordinary skill in the art will readily recognize that the functional elements depicted within printer controller 101 are intended merely as exemplary of functional elements within a printer controller enhanced in accordance with features and aspects hereof. Numerous other elements (not shown) may be useful in implementing these and other features of such an enhanced printer controller. Further, the depicted functional elements may be integrated or separated in a manner different than that shown in FIG. 1. Such design choices are readily apparent to those of ordinary skill in the art.

Figure 2:
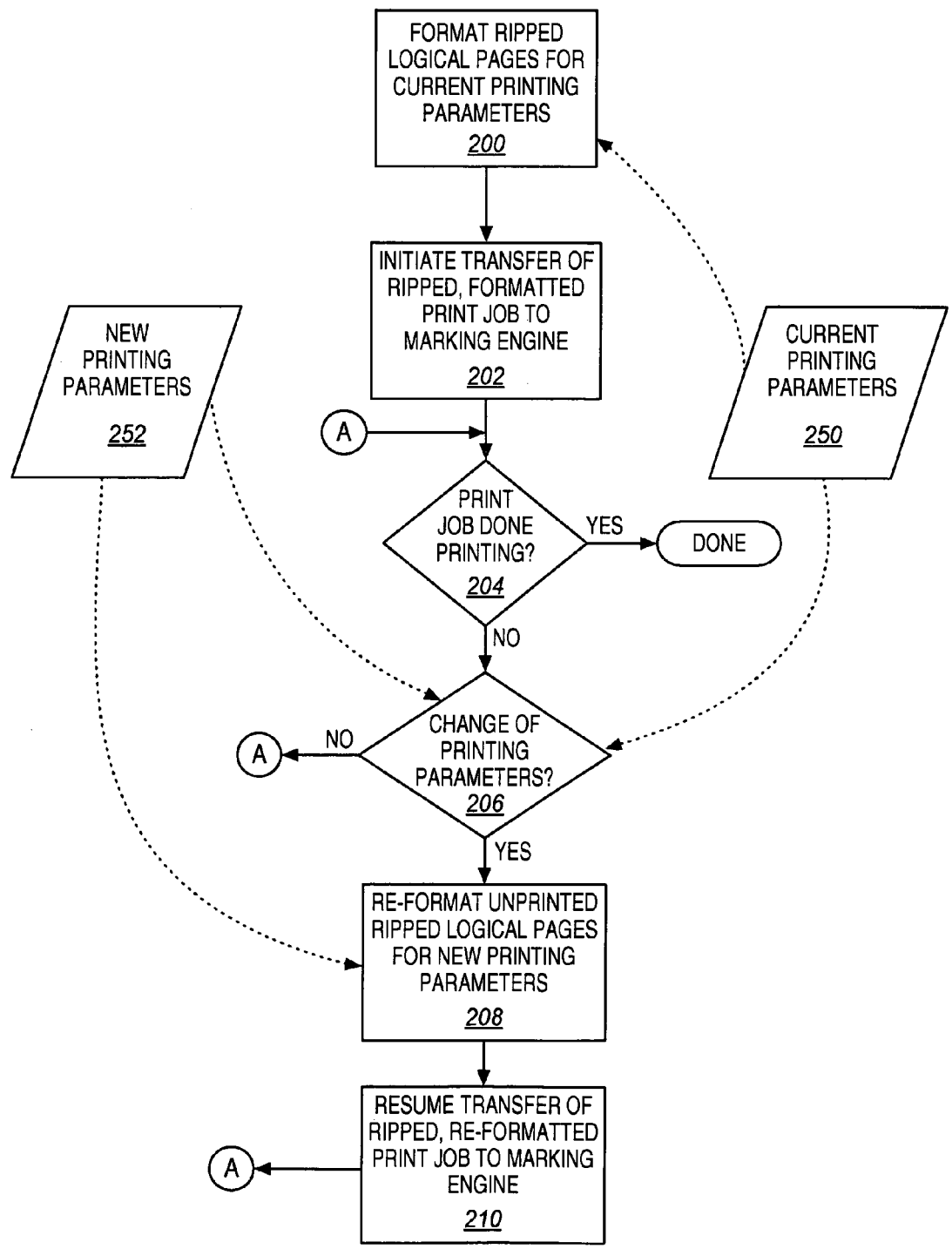
FIG. 2 is a flowchart of an exemplary method in accordance with features and aspects hereof operable in a printer controller of a printing system to permit dynamic changes to N-UP print job parameters during printing of the job.

FIG. 2 is a flowchart describing a method operable in accordance with features and aspects hereof within a printer controller to dynamically alter the formatting of previously rasterized print jobs in accordance with changed print parameters. Element 200 is operable to format logical pages of a previously rasterized print job in accordance with current printing parameters 250. Current printing parameters 250 may be those parameter values in effect at the time that element 200 commences its formatting operation. Element 200 therefore formats logical pages in accordance with the current printing parameters to generate physical sheet images for transfer to the marking engine.

Element 202 then initiates transfer of the rasterized, formatted print job to the marking engine. Elements 204 and 206 are then iteratively operable to await either completion of transfer of the print job to the marking engine or sensing changes in the current printing parameters. In particular, element 204 determines whether the print job has been completely transferred to the marking engine. If so, the job has been printed and the method is completed. If not, element 206 determines whether the current print parameters have been changed. Element 206 may detect such a change by comparing current print parameters 250 to new print parameters 252. As noted above, inter-process communication techniques or other means for signaling and detecting a change in the print parameters may be represented by the testing of element 206. If no change is detected by element 206, processing loops back to element 204 (label "A") to again await detection of either completion of the print job or a change to the printing parameters.

When element 206 detects a change to the printing parameters, element 208 is operable to reformat any presently unprinted rasterized logical pages in accordance with the new printing parameters. When the unprinted rasterized logical pages are reformatted in accordance with the new printing parameters, element 210 is operable to resume transfer of the reformatted print job to the marking engine. Processing then continues looping back to element 204 (label "A") to await completion of the print job by the marking engine or yet another change to the printing parameters.

Those of ordinary skill in the art will readily recognize that current print parameters 250 and new print parameters 252 may represent any suitable storage or signal exchange of print parameters associated with a previously rasterized print job, associated with the print engine, or associated with both a print job and a particular print engine. Further, those of ordinary skill in the art will recognize that detection of a change in the print parameters may be by any suitable comparison of previous and new print parameter values or may be implemented as appropriate inter-process messaging or signaling techniques or by any other suitable means and methods. Such design choices will be readily apparent to those of ordinary skill in the art.

Exemplary print parameters may include, for example:
N-UP Setting
Number of Copies
Logical Page "X of N-UP" Position
Front-Back Lock Logical Page Position
Front-Back Snap Logical Page Position As noted above, one common change to printing parameters may be a change in the value of N where N-UP printing is provided by the printer controller. When printing a rasterized N-UP print job, a change in the print engine used and/or the printable medium used during printing of the print job may require a change to the formatting of logical pages—i.e., a change to the value of N in N-UP formatting of the logical pages. A new value N' may be applied during printing of the previously rasterized print job such that the N-UP formatter features and aspects hereof may alter the N-UP printing of the previously rasterized print job using the new N' parameter value.

As noted earlier, such a change may be desirable where the paper supply is changed to a different size during printing of a lengthy rasterized print job or where a first print engine is used to start printing of a job but a second print engine is used to complete printing of the job (e.g., due to failure of the print engine or exhaustion of the paper supply on a first engine).

Other common examples giving rise to a need for changing printing parameters may include, for example, changes in the attributes and characteristics of a print engine used to complete printing of a print job. Where the first print engine is used to initiate printing of a rasterized job and a second print engine completes the printing process for the job, the parameters and characteristics of the second print engine may differ from those of the first print engine. For example, print image positioning associated with the first print engine may vary from the print image positioning of a second print engine used to complete printing of a lengthy print job. Thus, printing parameters may be modified during printing of the print job to account for differences in the print image positioning between the first and second print engine used for printing the job.

Figure 3:
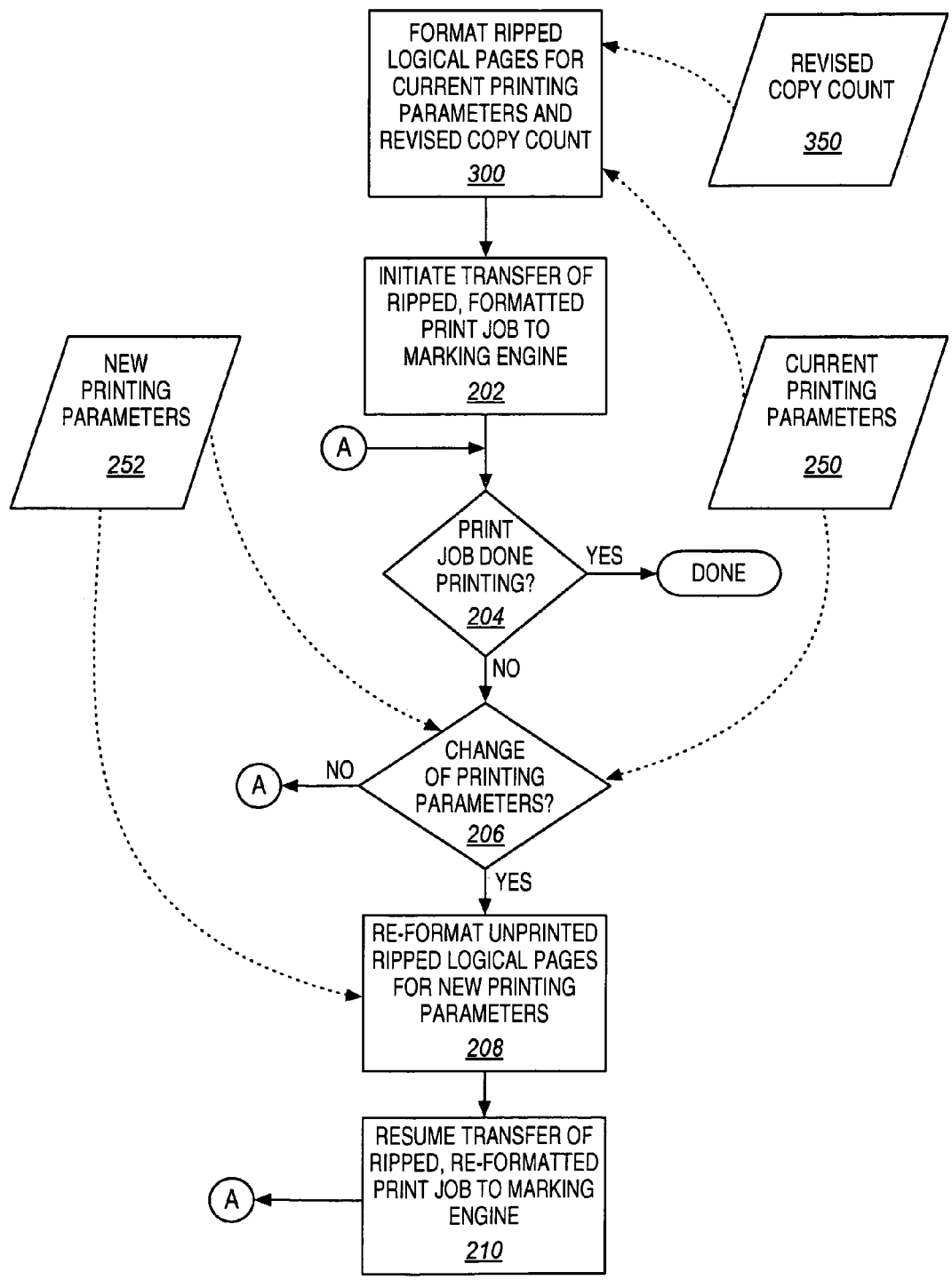
FIG. 3 is a flowchart of an exemplary method in accordance with features and aspects hereof operable in a printer controller of a printing system to permit dynamic changes to N-UP print job parameters during printing of the job including changes to the number of copies of a job to be printed.

FIG. 3 is a flowchart showing a method in accordance with features and aspects hereof. The flowchart of FIG. 3 is nearly identical to that of FIG. 2 but for one particular printing parameter that may be revised by the printer controller (through the operator interface). Features and aspects hereof allow numerous printing parameters to be modified at any time during printing of a rasterized print job. Included among such printing parameters is the copy count for a rasterized print job. During printing of a previously rasterized print job, it would be most common and useful to revise such a copy count only at the beginning of printing the job. Element 300 of FIG. 3 is therefore similar to element 200 of FIG. 2 and is operable to format the previously rasterized logical pages in accordance with all current printing parameters and the revised copy count 350 provided by operator interface features and aspects hereof. Once the rasterized print job has been formatted for current printing parameters 250 and the locally modified copy count 350, elements 202 through 210 are operable as discussed above with respect to FIG. 2 to permit the formatted, rasterized print job to be printed with other modified parameters at any time during printing of the print job.

By way of example, a previously rasterized print job may indicate (in its current printing parameters) that X copies are to be printed and collated by the printing system. An operator of the printing system may decide to override the copy count and print additional or fewer copies in accordance with particular needs the operator may be aware of. The operator may therefore specify that Y copies are to be printed prior to releasing the rasterized print job for printing on the associated marking engines. Features and aspects hereof represented by processing of element 300 would then format the previously rasterized print job for the most effective N-UP printing of the newly revised copy count for logical pages of the rasterized print job. In like manner, element 208 of FIG. 3 may reformat the unprinted pages of a previously formatted rasterized print job retaining the revised copy count or, though likely less useful, utilizing a new copy count provided in the new printing parameters 252. The initial format performed by element 300 or the reformat performed by element 208 may therefore modify the N-UP parameter associated with the printing parameters to most efficiently print the newly defined number of copies for the rasterized print job.

Figure 4:
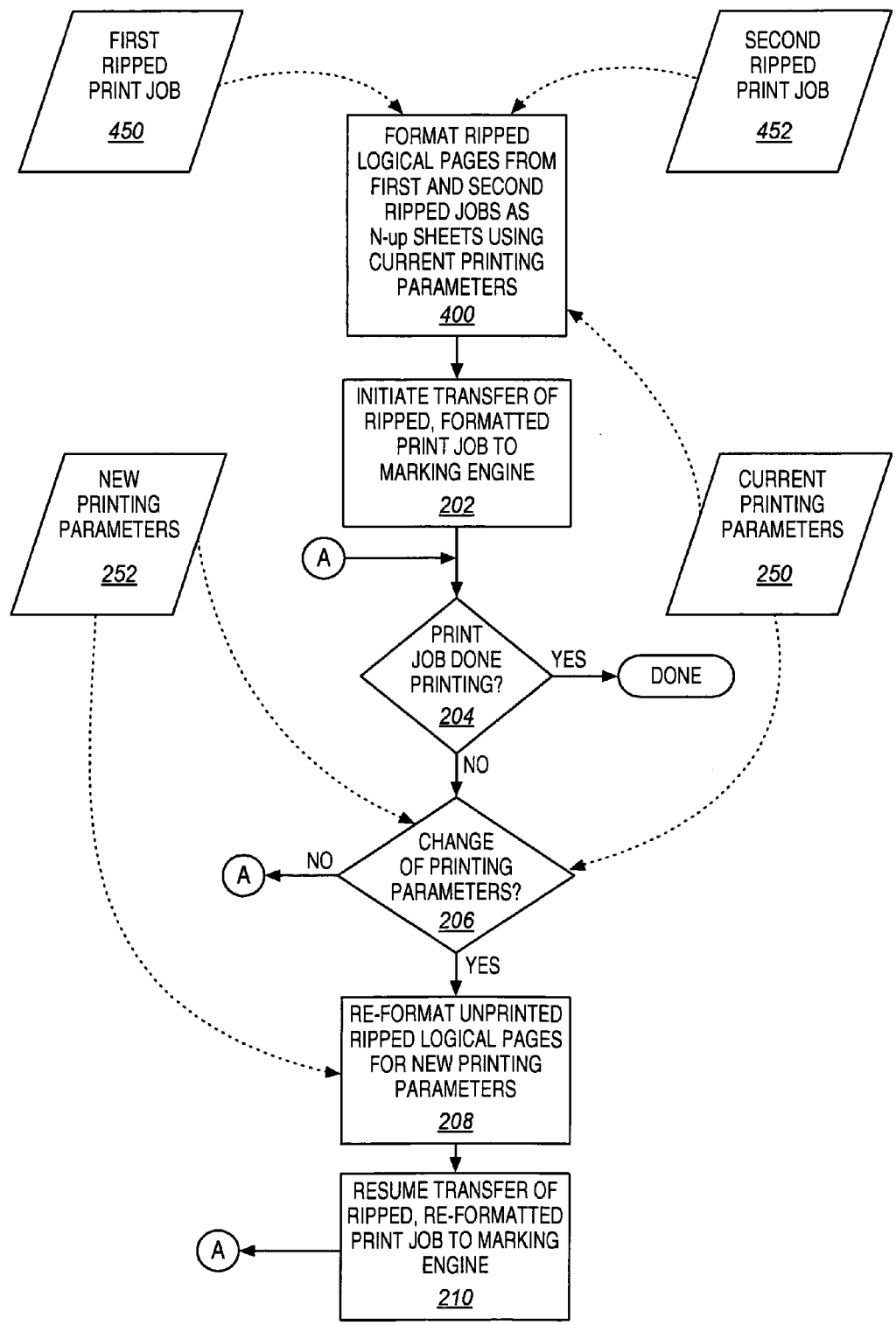
FIG. 4 is a flowchart of an exemplary method in accordance with features and aspects hereof operable in a printer controller of a printing system to permit dynamic changes to N-UP print job parameters during printing of the job including combining multiple rasterized print jobs into a single N-UP print job.

FIG. 4 is a flowchart describing yet another variation of a method operable in the printer controller in accordance with features and aspects hereof to modify formatting of rasterized print jobs for optimally printing multiple rasterized print jobs. The flowchart of FIG. 4 is substantially similar to that of FIG. 2 but for the processing of initial formatting element 400. A printing system, as noted above, may include features for supporting any number of page description languages or other encodings of page information. For example, a printing system may include support for PostScript, HP PCL, and other simple text encoding techniques such as ASCII or EBCDIC. Features and aspects hereof permit the formatting of multiple, independently rasterized print jobs as a single N-UP formatted print job. For example, where multiple previously rasterized print jobs each comprise but a single logical sheet, multiple such previously rasterized short print jobs may be formatted by operation of element 400 as an N-UP formatted sheet. Or, for example, where previously rasterized print jobs may comprise multiple logical pages, a plurality of such previously rasterized print jobs may be aggregated by operation of element 400 for printing as an N-UP print job.

In particular, element 400 is operable to receive a first rasterized print job 450 and a second rasterized print job 452 and to format the multiple, previously rasterized print jobs for printing as N-UP sheets in the printing system and otherwise in accordance with current printing parameters 250. Otherwise, processing of element 202 through 210 are operable as above in FIG. 2 to continue transfer of the formatted print job to the marking engine and to reformat as appropriate when new printing parameters are sensed.

Those of ordinary skill in the art will readily recognize that where multiple print jobs are formatted together as an N-UP print job, and where one of the multiple print jobs comprises fewer logical pages than another of the rasterized print jobs to be combined, modifications to the processing of FIG. 4 will be readily apparent such that an additional previously rasterized print job may be combined with the continued printing of the first (longer) print job such that multiple print jobs may continue to be printed as N-UP sheets through the printing engine. For example, element 204 could determine that one of the multiple print jobs (a shorter job) has completely printed and provide additional processing to select another previously rasterized print job. The additional selected print job is then combined with the remaining unprinted logical pages of the first previously rasterized print job—the longer print job. Processing would then continue until each of the multiple independent print jobs being combined on N-UP sheets has completed.

In another aspect, a single raw print job may be encoded using multiple page description languages and encoding. As noted above, for example, a single job may include a banner page encoded completely as ASCII/EBCDIC characters. Other pages of the same print job may be encoded in PostScript while still others may be encoded in HP PCL. Such a job may be so encoded because multiple computer applications may be involved in generating different portions of the raw print job. However, in so encoding a print job with multiple encodings, it is difficult for the generating application(s) to indicate the raw print job is to be rasterized as an N-UP print job. Each of the multiple encoding may use different techniques to so specify an N-UP parameter and still other encoding of pages may provide no technique for N-UP parameter encoding. Thus a single print job encoded in multiple encodings typically implies and N-UP value of 1. Thus, an aspect hereof permits each job printed to include multiple page description languages or encodings and allows changing of the N-UP printing parameter by print operator interaction at a printer console.

Those of ordinary skill in the art will readily recognize that the flowcharts of FIGS. 2 through 4 are intended merely as representative of exemplary methods operable in accordance with features and aspects hereof within a printer controller to permit flexible, dynamic modification to N-UP and other printing parameters during the printing of a rasterized print jobs. Numerous equivalent method steps and techniques will be readily apparent to those of ordinary skill in the art as a matter of design choice. Further, those of ordinary skill in the art will readily recognize that the methods described by FIGS. 2 through 4 may be implemented as custom designed electronic circuits, as suitably programmed instructions operable on a general or special purpose processor, or a combination of both custom circuits and suitably programmed instructions. Such design choices are readily apparent to those of ordinary skill in the art.

Figure 5:
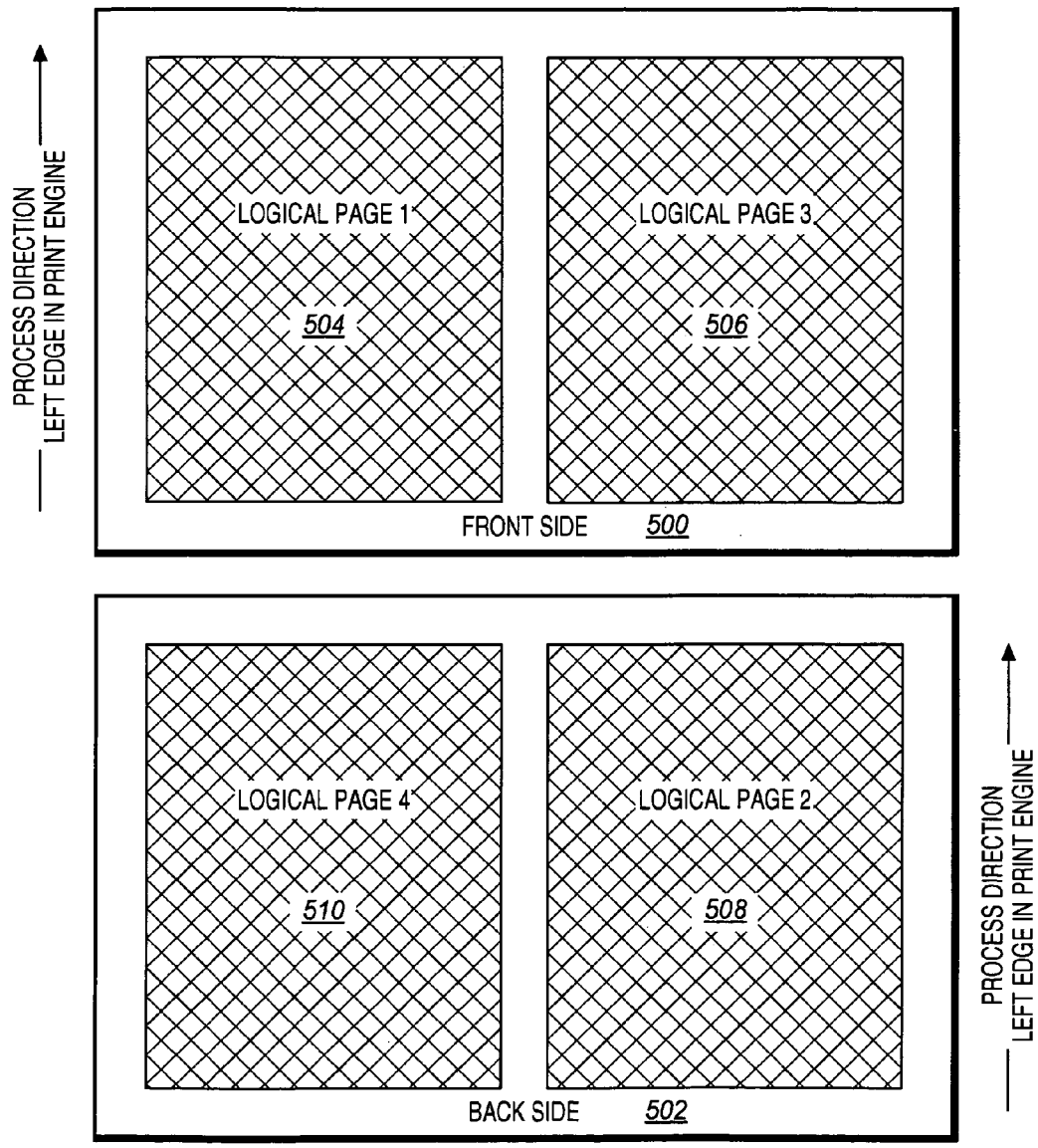
FIG. 5 is a block diagram of a duplex N-UP sheet where logical pages may be dynamically re-positioned and re-oriented in accordance with features and aspects hereof.

FIG. 5 is a diagram depicting an exemplary N-UP print job. A front side of the exemplary printed sheet 500 is shown having two logical pages positioned and formatted thereon: namely, logical page 1 (504) and logical page 3 (506). The arrow on the left edge of front side 500 indicates the direction of the printing process (through a corresponding exemplary marking engine) as well as the physical and logical placement of the left edge of the sheet of paper as it progresses through the print engine processing. As noted above, in high speed, continuous form printing systems, it is common to print duplex or two-sided print jobs using a second print engine coupled to the printer controller. The continuous form paper proceeds through a first marking engine to generate the images on front side 500 and then continues out of the first print engine to enter the second print engine intended for marking the back side 502 of the same sheet. Typically, in such a dual marking engine configuration, the continuous form paper is flipped about the axis in the direction of the paper process movement. Thus, back side 502 shows the same arrow on the right side of the depicted sheet as representing both the process direction and the logical left side of the sheet as it proceeds through the second print engine flipped as described. Thus, back side 502 shows logical pages 2 and 4 (508 and 510, respectively) in the opposite positions from logical pages 1 and 3 (504 and 506) of the front side 500.

In accordance with features and aspects hereof, an operator interface allows a printer operator to position any of the N-UP logical pages at any position on the physical sheet of paper (either on the front side or the back side in any orientation and position). The operator may define appropriate printing parameters to indicate the positioning and/or orientation of each logical page on a corresponding side of a sheet of paper to be passed through the printing system. Positioning of the logical page refers to its horizontal and/or vertical placement on the corresponding sheet of paper. Further in accordance with features and aspects hereof, the position and/or orientation of each logical page may be determined completely independent of all other logical pages on a sheet of paper. In other words, logical pages 1, 2, 3, and 4 (504, 508, 506, and 510) of FIG. 5 may be positioned independent of one another anywhere on the front or back side of a formatted sheet of paper.

Figure 6:
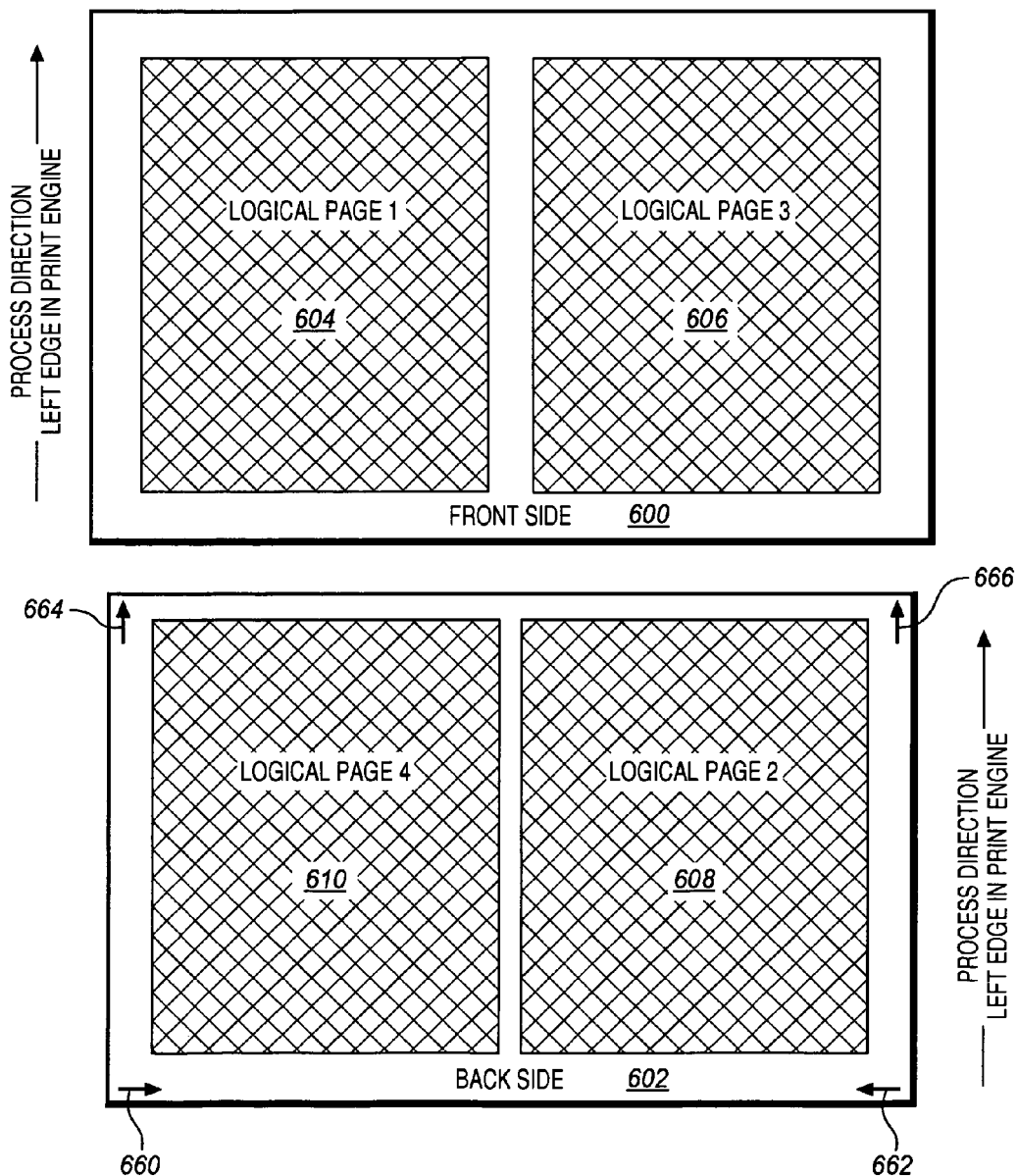
FIG. 6 is a block diagram of a duplex N-UP sheet where logical pages may be dynamically re-positioned and re-oriented in accordance with features and aspects hereof such that position and/or orientation of each logical page is independent of all other logical pages.

FIG. 6 is a diagram similar to that of FIG. 5 depicting one aspect hereof wherein printing parameters for formatting N-UP sheets are modified to re-position images on the back side 602 of a sheet of paper relative to the front side 600. As noted above, a first print engine used to affix images on a front side of the printed sheets may cause shrinkage of the paper as it is fed to the second print engine used for affixing images on the back side. To help assure that front side images and back side images are properly aligned relative to one another, the user may define printing parameters to re-position logical pages on the back side of a printed sheet.

Logical page 1 (604) and logical page 3 (606) are applied to front side 600. Logical page 4 (610) and logical page 2 (608) are applied to back side 602. Arrow 660 indicates the movement of logical page 4 (610) rightward and arrow 662 indicates movement of logical page 2 (608) leftward. Further, arrow 664 and 666 both indicate upward vertical re-positioning of logical pages on the back side 602 of the physical sheet. It will be noted that the movements of each page is independent of the position (or orientation) of every other logical page. The shown exemplary re-positioning of logical pages 2 and 4 (608 and 610) may be used to adjust for shrinkage of the physical sheets of paper as they move from the first print engine (imaging the front side 600) to the second print engine (imaging the back side 602). Regardless of the reason for such re-positioning, FIG. 6 demonstrates the independence of positioning (or orientation) of each logical page relative to all other logical pages.

Shrinkage of the paper is but one exemplary reason for re-positioning logical pages on a front side or back side of an N-UP printed job. Numerous other printing applications and associated conditions may give rise to the need for positioning one or more logical pages applied to N-UP sheets of paper. FIG. 6 therefore generally represents features and aspects hereof to independently re-position (or re-orient) any logical page of the plurality of logical pages printed N-UP on a sheet of paper. Other reasons for re-positioning and/or re-orienting logical pages as an N-UP print job may arise from other printing features and applications including, for example, post processing that follows the imaging of the printing system for cutting, binding, stapling, collating, etc.

Figure 7:
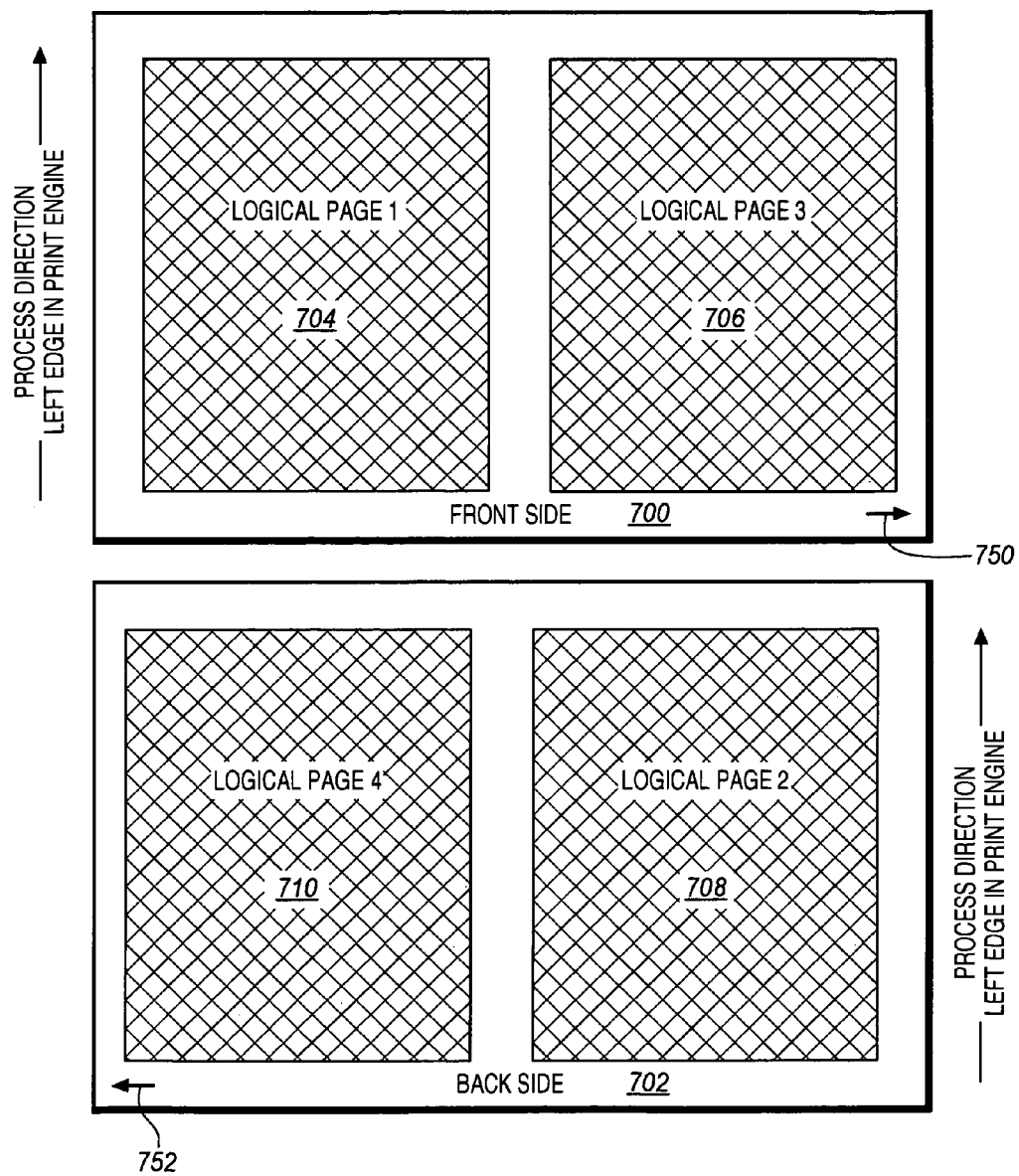
FIG. 7 is a block diagram of a duplex N-UP sheet where logical pages may be dynamically re-positioned and re-oriented in accordance with features and aspects hereof such that position of each logical pages on the back side of a sheet are dependent on the position of pages on the front side of a duplexed sheet of an N-UP print job.

FIG. 7 is a diagram similar to FIGS. 5 and 6 describing another aspect hereof wherein user interface options may be define printing parameters to automatically "lock" the relative positions of logical pages on the front side of an N-UP sheet relative to logical pages on the back side of the sheet. Also shown in FIG. 7 is a similar feature to automatically "snap" positions of the logical pages applied to the back side of a sheet of paper relative to images applied to the front side of the same sheet of paper. As shown in FIG. 7, front side 700 includes logical pages 1 and 3 (704 and 706, respectively). For any of several reasons logical page 3 (706) is adjusted to position further right on the front side 700 as indicated by arrow 750. To assure that the corresponding back side image logical page 4 (710) is correctly positioned, logical page 4 (710) on the back side 702 is similarly adjusted as indicated by arrow 752. It will be noted that the adjustment of logical page 4 is in the opposite direction because of the flip or twist of the continuous form paper as it is first imprinted on the front side 700 then subsequently imprinted on the back side 702.

User interface features and aspects hereof allow such adjustments in different directions to be automatically determined thus reducing potential for human error in computing appropriate adjustment directions and amounts. In one aspect, a "snap" option parameter may be specified (e.g., at the beginning of printing a previously rasterized job or at any time during printing thereof). The snap option printing parameter may be specified to indicate that the positioning of logical pages on the back side of any sheet should be "snapped" to the equivalent position of corresponding logical pages on the front side. Thus a printer operator may simply re-position logical pages on the back side of an N-UP two-sided print job by selecting the snap option. All pages on the back side are thus automatically snapped to appropriate corresponding positions corresponding to pages on the front side.

In another aspect hereof also shown in FIG. 7, user interface options may specify that the front side page positions are to be "locked" relative to the back side logical pages. In other words, when the lock option printing parameter is set, any movement of the front side images causes equivalent movement of corresponding back side images (in the proper direction considering the page orientations and any flip or twist of the paper medium). Thus, the user may initially move pages independently to re-position front side images independent of back side images and may then turn on the lock option such that any further movements on the front side will be mirrored on the back side corresponding images. Numerous other flexible features and aspects may be provided in the user interface to allow the dynamic adjustment to the relative page positions of previously rasterized print jobs.

Figure 8:
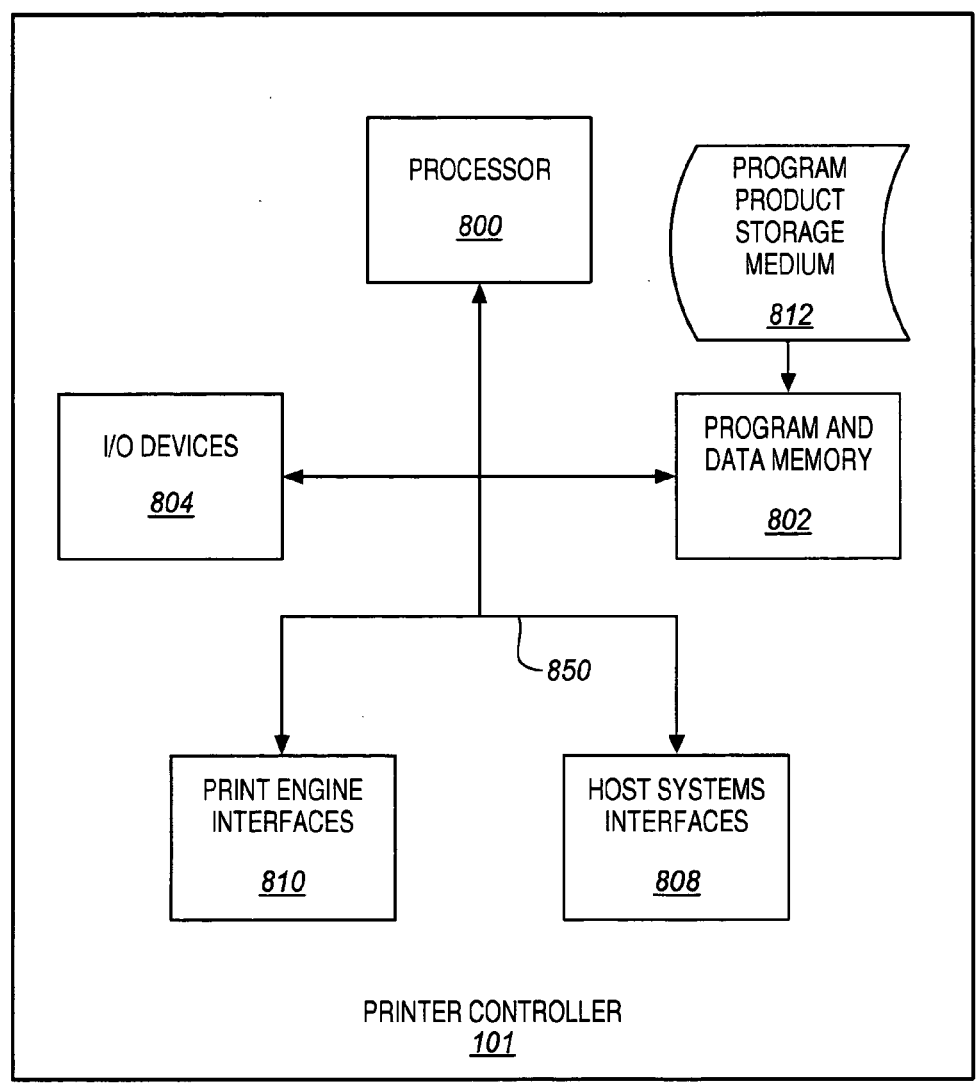
FIG. 8 is a block diagram of an exemplary data processing system that may provide printer controller features and aspects hereof including bulk storage of a program product that may embody methods and processes hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 8 is a block diagram depicting a printer controller 101 as a data processing device adapted to provide features and aspects hereof by executing programmed instructions and accessing data stored on a computer readable storage medium 812.

Furthermore, the invention can take the form of a computer program product accessible from a computer-usable or computer-readable medium 812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Examples of a computer-readable medium include a semi-conductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor 800 coupled directly or indirectly to memory elements 802 through a system bus 850. The memory elements can include local memory employed during actual execution of the program code, bulk storage, and cache memories which provide temporary storage of at least some program code in order to reduce the number of times code must be retrieved from bulk storage during execution.

Input/output or I/O devices 804 (including but not limited to keyboards, displays, pointing devices, etc.) can be coupled to the system either directly or through intervening I/O controllers. One particular I/O device useful in a data processing system adapted as a printer controller is a print engine interface 810 for coupling the printer controller 101 to the signals and protocols of the print engines adapted for marking pixels on paper.

Network adapters or other host system interfaces 808 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method comprising:
receiving a raw print job at a print controller;
rasterizing the raw print job at the print controller to generate a rasterized print job comprising logical pages;
formatting the logical pages of the rasterized print job into N-UP sheets;
distributing the N-UP sheets to continuous form print engines such that a first print engine prints a first portion of the rasterized print job onto a first side of a continuous feed of paper and a second print engine prints a second portion of the rasterized print job onto a second side of the continuous feed of paper;
receiving a changed parameter for the rasterized print job during printing to request a change in position for logical pages on the second side of the continuous feed, based on a physical change in dimensions of the continuous feed of paper between the first print engine and the second print engine; and
reformatting the logical pages of the rasterized job into N-UP sheets, wherein N is greater than one, by repositioning the logical pages according to the changed parameter, thereby compensating for the physical change in dimensions of the continuous feed of paper as the continuous feed travels between the print engines.

2. The method of claim 1 wherein:
repositioning the logical pages comprises modifying formatting of the logical pages as applied to physical paper sheets on the continuous feed of paper.

3. The method of claim 1 wherein:
the physical change in dimensions of the continuous feed is due to shrinkage of the continuous feed of paper.

4. The method of claim 1 wherein:
reformatting the logical pages of the rasterized job occurs without restarting printing of the rasterized print job.

5. The method of claim 1 wherein:
the raw print job is encoded using multiple page description languages.

6. The method of claim 1 wherein:
the raw print job is encoded using PostScript.

7. The method of claim 1, wherein:
the raw print job is encoded using ASCII.

8. A non-transitory computer readable medium embodying programmed instructions which, when executed by a processor, are operable for performing a method comprising:
receiving a raw print job at a print controller;
rasterizing the raw print job at the print controller to generate a rasterized print job comprising logical pages;
formatting the logical pages of the rasterized print job into N-UP sheets;
distributing the N-UP sheets to continuous form print engines such that a first print engine prints a first portion of the rasterized print job onto a first side of a continuous feed of paper and a second print engine prints a second portion of the rasterized print job onto a second side of the continuous feed of paper;
receiving a changed parameter for the rasterized print job during printing to request a change in position for logical pages on the second side of the continuous feed of paper, based on a physical change in dimensions of the continuous feed between the first print engine and the second print engine; and
reformatting the logical pages of the rasterized job into N-UP sheets, wherein N is greater than one, by repositioning the logical pages according to the changed parameter, thereby compensating for the physical change in dimensions of the continuous feed of paper as the continuous feed of paper travels between the print engines.

9. The medium of claim 8, wherein:
repositioning the logical pages comprises modifying formatting of the logical pages as applied to physical paper sheets on the continuous feed of paper.

10. The medium of claim 8, wherein:
the physical change in dimensions of the continuous feed is due to shrinkage of the continuous feed of paper.

11. The medium of claim 8, wherein:
reformatting the logical pages of the rasterized job occurs without restarting printing of the rasterized print job.

12. The medium of claim 8 wherein:
the raw print job is encoded using multiple page description languages.

13. The medium of claim 8 wherein:
the raw print job is encoded using PostScript.

14. The medium of claim 8, wherein:
the raw print job is encoded using ASCII.

15. A system comprising:
a first continuous form print engine for marking a first side of a continuous feed of paper;
a second continuous form print engine for marking a second side of the continuous feed; and
a print controller comprising:
   an operator interface;
   a host interface that receives a raw print job;
   a print job rasterizer that rasterizes the raw print job to generate a rasterized print job comprising logical pages; and
   an N-UP sheet formatter that formats the logical pages of the rasterized print job into N-UP sheets, and distributes the N-UP sheets to the continuous form print engines such that the first print engine prints a first portion of the rasterized print job onto a first side of the continuous feed of paper and the second print engine prints a second portion of the rasterized print job onto a second side of the continuous feed of paper,
   wherein the operator interface receives a changed parameter for the rasterized print job during printing to request a change in position for logical pages on the second side of the feed, based on a physical change in dimensions of the continuous feed of paper between the first print engine and the second print engine, and
   wherein the N-UP sheet formatter reformats the logical pages of the rasterized job into N-UP sheets, wherein N is greater than one, by repositioning the logical pages according to the changed parameter, thereby compensating for the physical change in dimensions of the continuous feed of paper as the feed travels between the print engines.

16. The system of claim 15 wherein:
The N-UP sheet formatter repositions the logical pages by modifying formatting of the logical pages as applied to physical paper sheets on the continuous feed of paper.

17. The system of claim 15 wherein:
the physical change in dimensions of the continuous feed is due to shrinkage of the continuous feed of paper.

18. The system of claim 15 wherein:
the N-UP formatter reformats the logical pages of the rasterized print job without restarting printing of the rasterized print job.

19. The system of claim 15 wherein:
the raw print job is encoded using multiple page description languages.

20. The system of claim 15 wherein:
the raw print job is encoded using PostScript.

* * * * *